(12) United States Patent
Marling

(10) Patent No.: US 9,789,741 B1
(45) Date of Patent: Oct. 17, 2017

(54) VEHICLE TOW DEVICE FOR WHEELED CONTAINERS

(71) Applicant: Kurt D. Marling, Janesville, WI (US)

(72) Inventor: Kurt D. Marling, Janesville, WI (US)

( * ) Notice: Subject to any disclaimer, the term of this patent is extended or adjusted under 35 U.S.C. 154(b) by 25 days.

(21) Appl. No.: 14/849,939

(22) Filed: Sep. 10, 2015

Related U.S. Application Data

(60) Provisional application No. 62/060,831, filed on Oct. 7, 2014.

(51) Int. Cl.
| | |
|---|---|
| *B60R 9/06* | (2006.01) |
| *B60D 1/14* | (2006.01) |
| *B60D 1/52* | (2006.01) |
| *B65F 1/14* | (2006.01) |
| *B60D 1/00* | (2006.01) |

(52) U.S. Cl.
CPC .............. *B60D 1/14* (2013.01); *B60D 1/00* (2013.01); *B60D 1/52* (2013.01); *B60R 9/06* (2013.01); *B65F 1/1468* (2013.01)

(58) Field of Classification Search
CPC ............ B60D 1/00; B60R 9/06; B65F 1/1468
USPC ............ 248/907, 500, 503, 220.21; 224/519, 224/928, 495, 502, 509, 531, 532
See application file for complete search history.

(56) References Cited

U.S. PATENT DOCUMENTS

| | | | | |
|---|---|---|---|---|
| 3,279,819 A | * | 10/1966 | Edmonds | B60D 1/155 |
| | | | | 280/479.3 |
| 3,877,622 A | * | 4/1975 | McLain | B60R 9/10 |
| | | | | 211/17 |
| 4,411,461 A | * | 10/1983 | Rosenberg | B60R 9/06 |
| | | | | 211/17 |
| 4,676,414 A | * | 6/1987 | Deguevara | B60R 9/06 |
| | | | | 224/500 |
| 5,004,133 A | * | 4/1991 | Wyers | B60R 9/06 |
| | | | | 224/519 |
| 5,011,361 A | * | 4/1991 | Peterson | B60R 9/06 |
| | | | | 224/497 |
| 5,190,195 A | * | 3/1993 | Fullhart | B60R 9/10 |
| | | | | 224/497 |
| 5,330,084 A | * | 7/1994 | Peters | B60R 9/06 |
| | | | | 211/171 |

(Continued)

FOREIGN PATENT DOCUMENTS

FR          2437323 A1 *  4/1980    ............... B60R 9/06

*Primary Examiner* — Joseph M Rocca
*Assistant Examiner* — Daniel S Yeagley
(74) *Attorney, Agent, or Firm* — Donald J. Ersler

(57) ABSTRACT

A vehicle tow device for wheeled containers preferably includes a hitch insert, an upright member, at least one support member and at least two retention members. The hitch insert preferably includes a U-shaped cross. The upright member preferably includes a U-shaped cross section and a horizontal flange extending from a top thereof. The hitch insert is attached to the upright member. Each support member includes a top flange and a side flange. Each support member is pivotally engaged with the horizontal flange. Each retention member includes a first retention flange and a second retention flange. Preferably, a bottom of the second retention flange is bent upward, substantially perpendicular to itself to form a non-pivot flange. A top of the second retention flange is bent to an acute angle to form a retention flange. The second retention flange is attached to a side flange of the support member.

15 Claims, 3 Drawing Sheets

(56) References Cited

U.S. PATENT DOCUMENTS

| | | | | |
|---|---|---|---|---|
| 5,372,287 | A * | 12/1994 | Deguevara | B60R 9/06 224/309 |
| 5,803,330 | A * | 9/1998 | Stack | B60R 9/048 224/518 |
| 5,950,891 | A * | 9/1999 | Brungardt | B60R 9/06 224/497 |
| 6,045,022 | A * | 4/2000 | Giles | B60R 9/06 224/488 |
| 6,126,188 | A * | 10/2000 | Volodarsky | B60D 1/07 224/544 |
| 6,371,309 | B1 * | 4/2002 | Smith | B62H 3/12 211/17 |
| 6,463,686 | B1 * | 10/2002 | Eisenbraun | B60D 1/60 280/507 |
| 6,595,398 | B2 * | 7/2003 | Himel, Jr. | B60R 9/06 224/495 |
| 6,918,520 | B2 * | 7/2005 | Skinner | B62D 43/02 224/282 |
| 7,195,269 | B2 * | 3/2007 | Tambornino | B60D 1/00 280/491.1 |
| 7,614,637 | B1 | 11/2009 | Kidd | |
| 8,162,192 | B1 * | 4/2012 | Sanchez | B60D 1/155 224/521 |
| 8,251,265 | B2 * | 8/2012 | Grudek | B62D 43/02 224/42.12 |
| 2004/0164517 | A1 | 8/2004 | Lewy et al. | |
| 2004/0232184 | A1 | 11/2004 | Moen et al. | |
| 2005/0161906 | A1 | 7/2005 | Thelen | |
| 2009/0101685 | A1 * | 4/2009 | Robb | B60R 9/065 224/495 |
| 2011/0011909 | A1 * | 1/2011 | Liu | B60R 9/10 224/501 |
| 2012/0125965 | A1 * | 5/2012 | Castro | B60R 9/10 224/534 |

* cited by examiner

VEHICLE TOW DEVICE FOR WHEELED CONTAINERS

CROSS-REFERENCES TO RELATED APPLICATIONS

This is a non-provisional patent application, which claims the benefit of provisional application No. 62/060,831 filed on Oct. 7, 2014.

BACKGROUND OF THE INVENTION

Field of the Invention

The present invention relates generally to towing and more specifically to a vehicle tow device for wheeled containers, which allows the wheeled container to be towed without a secondary securement feature.

Discussion of the Prior Art

Moving and transporting standard community issued trash bins or purchased trash bins by hand to their pick-up area has always been an awkward and tedious task. There is also an extra chore of having to make two trips due to garbage containers being separate from recycling containers. Transporting the garbage containers and recycling containers becomes even more difficult, when the homeowner has a long or steep driveways. Patent publication no. 2004/0164517 to Lewy et al. discloses a trash can trolley. Patent publication no. 2004/0232184 to Moen et al. discloses a vehicle tow accessory for wheeled receptacle. Patent publication no. 2005/0161906 to Thelen discloses a transport assistance device for large, wheeled refuse containers. U.S. Pat. No. 7,614,637 to Kidd discloses a refuse container hitching device. The previously mentioned devices include a secondary feature, which must be secured to a handle of the container. Application of the secondary feature takes extra time and may fail after repeated use.

Accordingly, there is a clearly felt need in the art for a vehicle tow device for wheeled containers, which allows the wheeled container to be towed without a secondary securement feature.

SUMMARY OF THE INVENTION

The present invention provides a vehicle tow device for wheeled containers, which allows the wheeled container to be towed without a secondary securement feature. The vehicle tow device for wheeled containers (vehicle tow device) preferably includes a hitch insert, an upright member, at least one support member and at least two retention members. The hitch insert preferably includes a U-shaped cross section with a first hitch flange, a second hitch flange and a base hitch member. At least two hitch attachment holes are formed through one end of the first and second hitch flanges and a hitch pin hole is formed through an opposing end of the first and second hitch flanges. The upright member preferably includes a U-shaped cross section with a first upright flange, a second upright flange, a base upright member and a horizontal flange. A plurality of upright attachment holes are formed through the first and second upright flanges. The plurality of upright attachment holes allow the hitch insert to be attached to the upright member at different heights with a plurality of fasteners. The horizontal flange is created by bending over an extended length at a top of the base upright member, substantially perpendicular to itself. A support hole is formed through the horizontal flange.

Each support member includes a top flange and a side flange. The side flange extends downward from an edge of the top flange. At least two retention holes are formed through the side flange. A pivot hole is formed through the top flange for pivotal attachment to the horizontal flange of the upright member with a fastener. Each retention member includes a first retention flange and a second retention flange. The second retention flange extends outward from an edge of the first retention flange. The second retention flange includes a longer length than the first retention flange. A bottom of the second retention flange is bent upward, substantially perpendicular to itself to form a non-pivot flange. A top of the second retention flange is bent to an acute angle to form an engagement flange. A retention hole is formed through a bottom of the second retention flange for attachment to the side flange of the support member with a fastener. The non-pivot flange prevents pivoting of the retention member relative to the support member. In use, the hitch insert is inserted into a tubular trailer hitch and retained with a hitch pin. The handle of at least one container is positioned between the support member and the engagement flange of the retention member, such that the handle is pulled by the retention member.

Accordingly, it is an object of the present invention to provide a vehicle tow device, which allows the wheeled container to be towed without a secondary securement feature.

These and additional objects, advantages, features and benefits of the present invention will become apparent from the following specification.

DETAILED DESCRIPTION OF THE PREFERRED EMBODIMENTS

Figure 1:
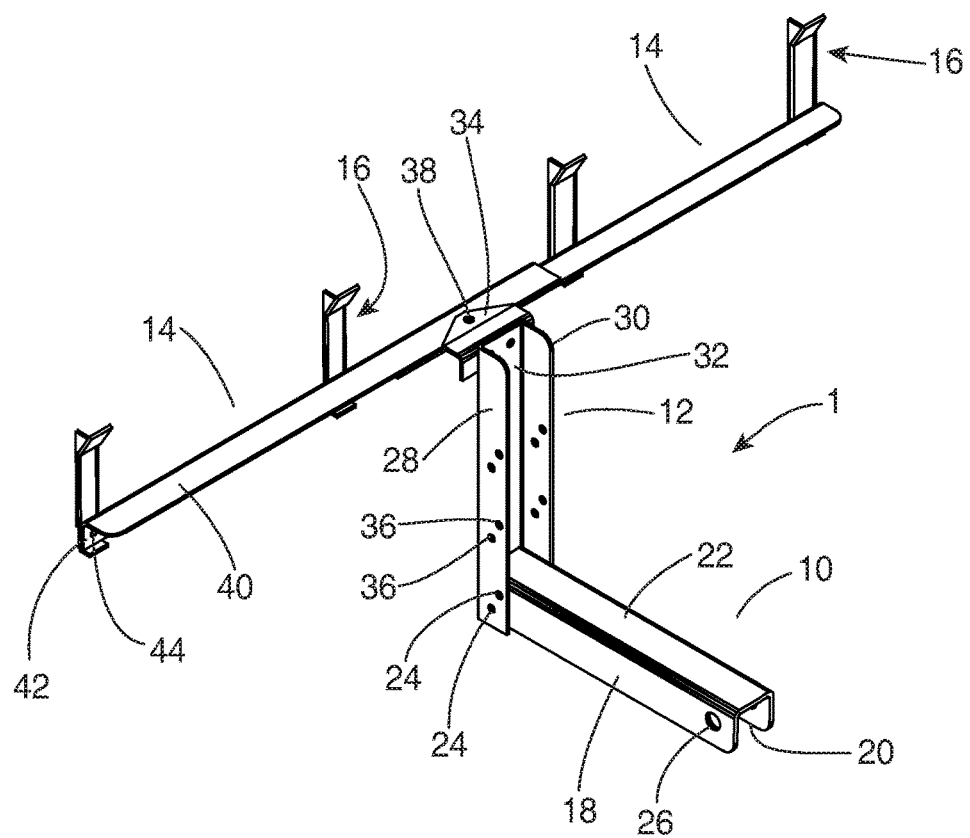
FIG. 1 is a perspective view of a vehicle tow device in accordance with the present invention.

With reference now to the drawings, and particularly to FIG. 1, there is shown a perspective view of a vehicle tow device 1. The vehicle tow device 1 preferably includes a hitch insert 10, an upright member 12, at least one support member 14 and at least two retention members 16. The hitch insert 10 preferably includes a first hitch flange 18, a second hitch flange 20 and a base hitch member 22. However, the hitch insert 10 may be a square tube or have any other suitable cross-sectional shape. The first hitch flange 18 extends outward from one edge of the base hitch member 22 and the second hitch flange 20 extends outward from an opposing edge of the base hitch member 22. At least two hitch attachment holes 24 are formed through one end of the first and second hitch flanges 18, 20 and a hitch pin hole 26 is formed through an opposing end of the first and second hitch flanges 18, 20. The upright member 12 preferably includes a first upright flange 28, a second upright flange 30, a base upright member 32 and a horizontal flange 34. An inside distance between the first and second upright flanges 28, 30 is preferably sized to receive an outer width of the hitch insert 10. The first upright flange 28 extends from one edge of the base upright member 32 and the second upright flange 30 extends from an opposing edge of the upright member 32. A plurality of upright attachment holes 36 are formed through the first and second upright flanges 28, 30. The plurality of upright attachment holes allow the hitch insert 10 to be attached to the upright member at different heights with a plurality of fasteners (not shown). The horizontal flange 34 is created by bending over an extended length at a top of the base upright member 32, substantially perpendicular to itself. A support hole 38 is formed through the horizontal flange 34.

Figure 3:
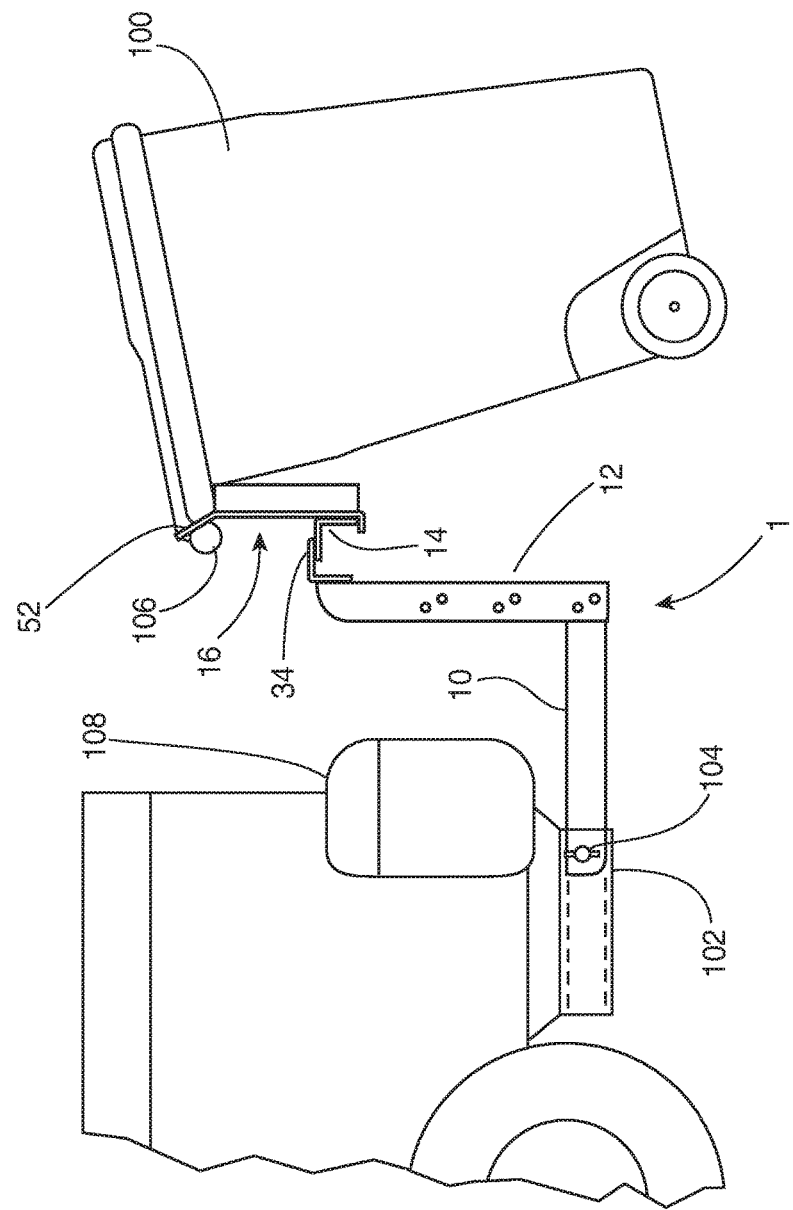
FIG. 3 is a side view of a vehicle tow device retained in a hitch of a vehicle and towing at least one wheeled container in accordance with the present invention.

Each support member 14 includes a top flange 40 and a side flange 42. The side flange 42 extends downward from an edge of the top flange 40. At least two retention holes 44 are formed through the side flange 42. A pivot hole is formed through the top flange 40 for pivotal attachment to the horizontal flange 34 of the upright member 12 with a pivot fastener (not shown). With reference to FIG. 3, two support members 14 are used to retain two wheeled containers 100. A single support member 14 may be used to retain a single wheeled container 100. However, a single support member 14 with sufficient length may be used to retain two wheel containers 100. Two support members 14 may be used to reduce size of a package.

Figure 2:
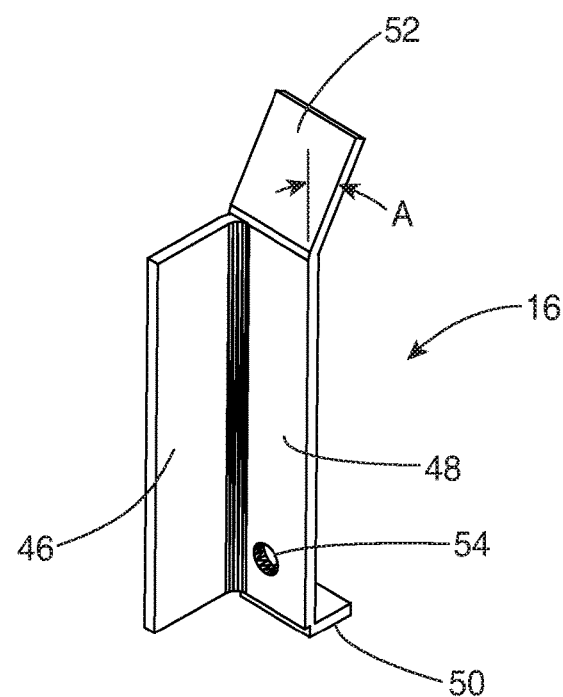
FIG. 2 is an enlarged perspective view of a retention member of a vehicle tow device in accordance with the present invention.

With reference to FIG. 2, each retention member 16 includes a first retention flange 46 and a second retention flange 48. The second retention flange 48 extends outward from an edge of the first retention flange 46. The second retention flange 48 includes a longer length than the first retention flange 46. A bottom of the second retention flange 48 is bent upward, substantially perpendicular to itself to form a non-pivot flange 50. A top of the second retention flange 48 is bent to an acute angle "A" to form an engagement flange 52. Angle "A" has a preferred value of about between 20-45 degrees. However, other angles values may also be used. A retention hole 54 is formed through a bottom of the second retention flange 48 for attachment to the side flange 42 of the support member 14 with a fastener (not shown). The non-pivot flange 50 engages a bottom of the side flange 42 and prevents pivoting of the retention member 16 relative to the support member 14.

With reference to FIG. 3, the hitch insert 10 is inserted into a tubular trailer hitch 102 and retained with a hitch pin 104. A handle 106 of at least one wheeled container 100 is positioned between the support member 14 and the engagement flange 52 of the retention member 16. The handle 106 of the wheeled container 100 is pulled by the retention flange 16. The at least one wheeled container 100 is pulled by a vehicle 108. The at least one support member 14 pivots relative to the horizontal flange 34 with a pivot fastener (not shown). The vehicle tow device 1 is shown as being assembled with fasteners, but could be assembled by welding or any other suitable method.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A vehicle tow device for wheeled containers comprising:
    a hitch insert;
    an upright member includes a first upright flange, a second upright flange, a base upright member, a horizontal flange extends outward from a top of said base upright member, said hitch insert is secured to said first and second upright flanges;
    at least one support member includes a top flange and a side flange, said side flange extends downward from an edge of said top flange, said top flange of said at least one support member is pivotally secured to said horizontal flange of said upright member with a pivot fastener, said top flange is capable of pivoting relative to said horizontal flange in a horizontal plane; and
    at least two retention members each include a first retention flange and a second retention flange extending from said first retention flange, an engagement flange extends from a top of said second retention flange, said at least two retention members are attached to said side flange.

2. The vehicle tow device for wheeled containers of claim 1 wherein:
    a plurality of upright attachment holes are formed through said first and second upright flanges, at least two hitch attachment holes are formed through one end of said hitch insert to mate with said plurality of upright attachment holes.

3. The vehicle tow device for wheeled containers of claim 2 wherein:
    a hitch pin hole is formed through an opposing end of said hitch insert to receive a hitch pin.

4. The vehicle tow device for wheeled containers of claim 1 wherein:
    a non-pivoting flange extends from a bottom of said second retention flange.

5. The vehicle tow device for wheeled containers of claim 1 wherein:
    said at least one support member comprises two support members, said two support members are secured to said horizontal flange.

6. A vehicle tow device for wheeled containers comprising:
    a hitch insert includes a first hitch side, a second hitch side and a base hitch member;
    an upright member includes a first upright flange, a second upright flange, a base upright member, a horizontal flange extends outward from a top of said base upright member, said hitch insert is secured to said first and second upright flanges; at least one support member includes a top flange and a side flange, said side flange extends downward from an edge of said top flange, said at least one support member is pivotally engaged with said horizontal flange; and
    at least two retention members each include a first retention flange and a second retention flange extending from said first retention flange, an engagement flange extends from a top of said second retention flange, said at least two retention members are attached to said side flange, a non-pivoting flange extends from a bottom of said second retention flange, said non-pivoting flange contacts a bottom of said side flange of said at least one support member, wherein said at least two retention members do not pivot relative to said at least one support member.

7. The vehicle tow device for wheeled containers of claim 6 wherein:
    a plurality of upright attachment holes are formed through said first and second upright flanges, at least two hitch attachment holes are formed through one end of said first and second hitch sides to mate with said plurality of upright attachment holes.

8. The vehicle tow device for wheeled containers of claim 7 wherein:
a hitch pin hole is formed through an opposing end of said first and second hitch sides to receive a hitch pin.

9. The vehicle tow device for wheeled containers of claim 6 wherein:
a non-pivoting flange extends from a bottom of said second retention flange.

10. The vehicle tow device for wheeled containers of claim 6 wherein:
said at least one support member comprises two support members, said two support members are pivotally engaged with said horizontal flange.

11. A vehicle tow device for wheeled containers comprising:
a hitch insert includes a first hitch side, a second hitch side and a base hitch member;
an upright member includes a first upright flange, a second upright flange, a base upright member, a horizontal flange extends outward from a top of said base upright member, said hitch insert is secured between said first and second upright flanges;
at least one support member includes a top flange and a side flange, said side flange extends downward from an edge of said top flange, said at least one support member is pivotally engaged with said horizontal flange; and
at least two retention members each include a first retention flange and a second retention flange, said second retention flange extending substantially perpendicular from said first retention flange, said first and second retention flanges having a substantially vertical orientation, an engagement flange extends from a top of said second retention flange at an acute angle relative to a vertical plane, said engagement flange extends away from said first retention flange, said at least two retention members are attached to said side flange.

12. The vehicle tow device for wheeled containers of claim 11 wherein:
a plurality of upright attachment holes are formed through said first and second upright flanges, at least two hitch attachment holes are formed through one end of said first and second hitch sides to mate with said plurality of upright attachment holes.

13. The vehicle tow device for wheeled containers of claim 12 wherein:
a hitch pin hole is formed through an opposing end of said first and second hitch sides to receive a hitch pin.

14. The vehicle tow device for wheeled containers of claim 11 wherein:
a non-pivoting flange extends from a bottom of said second retention flange.

15. The vehicle tow device for wheeled containers of claim 11 wherein:
said at least one support member comprises two support members, said two support members are pivotally engaged with said horizontal flange.

* * * * *